United States Patent Office 3,775,376
Patented Nov. 27, 1973

3,775,376
PROCESS OF PREPARING POLYURETHANES FROM ALIPHATIC POLYISOCYANATE AND POLYHYDROXY COMPOUND IN THE PRESENCE OF CATALYST CONTAINING 4-N:N-DIMETHYLAMINOPYRIDINE AND DI-ALKYL TIN DIALKANOATE
Brian John Bircher, Manchester, England, assignor to Imperial Chemical Industries Limited, London, England
No Drawing. Filed June 29, 1972, Ser. No. 267,536
Claims priority, application Great Britain, July 15, 1971, 33,311/71
Int. Cl. C08g 22/38
U.S. Cl. 260—77.5 AC  4 Claims

ABSTRACT OF THE DISCLOSURE

A process for the manufacture of a polyurethane by the reaction between an organic polyisocyanate and an organic polyhydroxy compound wherein as catalyst there is employed a mixture of a dialkyl tin dialkanoate and a 4-N,N-dialkylaminopyridine. This catalyst mixture has a synergistic effect not found with other mixtures, and is particularly valuable for use with aliphatic polyisocyanates of low reactivity.

---

This invention relates to the manufacture of polyurethanes and more particularly to catalysts which are especially useful in the manufacture of polyurethanes from aliphatic polyisocyanates.

Polyurethanes are obtained by the reaction of organic polyhydroxy compounds with organic polyisocyanates, and it is known to catalyse the reaction by the use of various classes of compounds, for example, heavy metal salts of fatty acids, tertiary amines, dialkyl tin dialkanoates and certain transition metal complexes.

Polyisocyanates in which the isocyanate groups are attached to an aromatic nucleus are much more reactive towards hydroxyl group-containing compounds than are aliphatic polyisocynates. In many cases when using an aromatic polyisocyanate in the preparation of polyurethane, no catalyst is necessary. When it is desired to increase the reaction rate, the mild catalysis provided by a tertiary amine is often sufficient.

Aliphatic polyisocyanates, on the other hand, react comparatively slowly with polyhydroxy compounds and a catalyst is usually needed to promote the urethane forming reaction. These isocyanates are particularly useful in the preparation of polyurethanes which resist discoloration on exposure to light, a property which is important for certain applications such as surface coatings. After the application of a polyurethane surface coating composition to a substrate, it is desirable that the coating should cure and become tack-free as soon as possible, otherwise particles of dust from the atmosphere will adhere to the partially cured coating and make it difficult or impossible to obtain a smooth and unblemished finish.

Of the catalysts mentioned above, the transition metal complexes, for example, the acetylacetonates of manganese and iron, are satisfactory in increasing the rate of reaction of aliphatic polyisocyanates with polyhydroxy compounds to the desired extent, but suffer from the disadvantage that they are coloured compounds and therefore cannot be employed in the preparation of unpigmented surface coatings or other colourless polyurethanes. The remaining types of catalyst are not sufficiently active to give the rate of cure necessary for surface coating compositions, although they have been used in the absence of better catalysts.

It has now been found that a satisfactory catalyst for use in the preparation of aliphatic polyisocyanate-based polyurethanes is a mixture of a dialkyl tin dialkanoate and a 4-N,N-dialkylaminopyridine. Thus, according to the present invention there is provided a process for the manufacture of a polyurethane by the reaction between an organic polyisocyanate and an organic polyhydroxy compound, wherein as catalyst there is employed a mixture of a dialkyl tin dialkanoate and a 4-N,N-dialkyl-aminopyridine.

The dialkyl tin-dialkanoates which may be used in the invention have the general formula $R_2Sn(COOR^1)_2$ wherein R and $R^1$ each independently represent an alkyl, cycloalkyl or aralkyl group containing from 1 to 20 carbon atoms. It is preferred that R is an alkyl group of from one to six carbon atoms and that $R^1$ is an alkyl group of from one to twelve carbon atoms. As examples of such dialkyl tin dialkanoates there may be mentioned dibutyl tin diacetate and dibutyl tin diluarate, the latter being the preferred compound.

The 4-N,N-dialkylaminopyridines which are used have the formula

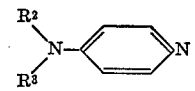

wherein $R^2$ and $R^3$ each independently represent an alkyl group containing from one to eight carbon atoms or an aralkyl group, or wherein $R^2$ and $R^3$ together form a saturated 5- or 6-membered heterocyclic ring including the nitrogen atom and which may include a further hetero atom.

As examples of the alkyl groups represented by $R^2$ and $R^3$ there may be mentioned methyl, ethyl, n-propyl, isopropyl and the isomeric butyl groups. Araliphatic groups represented by $R^2$ and $R^3$ include benzyl and β-phenylethyl. Compounds of the above formula in which $R^2$ and $R^3$ together form a saturated heterocyclic ring including the nitrogen atom include 4-pyrrolidinopyridine and 4-piperidinopyridine and compounds in which the 5- or 6-membered ring includes a further hetero atom are, for example, 4-piperazinopyridine and 4-morpholinopyridine. Particularly useful tertiary amines are 4-pyrrolidinopyridine 4-N,N-diethylamino-pyridine and 4-N,N-dimethylaminopyridine, the latter being the preferred compound.

The catalyst mixture will generally contain from 80% to 33% by weight of the dialkyl tin dialkanoate component, although amounts outside these limits may be used. It is preferred to use from 75% to 50% by weight of dialkyl tin dialkanoate.

The amount of catalyst which is employed may be from 0.01% to 5.0% by weight, preferably 0.05% to 2.5% by weight, based on the total weight of polyisocyanate and isocyanate-reactive components employed in preparing the polyurethane.

As examples of the aliphatic polyisocyanates which may be used in the preparation of polyurethanes according to the present invention there may be mentioned hexamethylene diisocyanate, 2,2,4 - trimethyl and 2,4,4-trimethyl-hexamethylene diisocyanates, the methylcyclohexylene diisocyanates, 4,4'-diisocyanatodicyclohexylmethane and particularly 3 - isocyanatomethyl-3,5,5-trimethylcyclohexyl isocyanate (also known as isophorone diisocyanate) the rate of reaction of which with polyhydroxy compounds is very slow and which therefore benfits considerably from the use of the catalyst mixture as defined above. It will be understood that the catalyst mixture may also be used to catalyse the reaction of aromatic diisocyanates with polyhydroxy compounds, although its activity is greater than is normally necessary for the aromatic diisocyanates which are conventionally employed in polyurethane manufacture, for example, tolylene-2,4- and -2,6-diisocyanates and diphenylmethane-4,4'-diisocyanate.

The polyhydroxy compounds which may be used in the present process are those which are conventionally employed in the preparation of polyurethanes, namely hydroxyl-ended polyesters, polyesteramides and polyethers and simple polyhydric alcohols of low molecular weight. The hydroxyl-ended polyesters and polyesteramides are prepared by known methods from dicarboxylic acids, glycols and, as necessary minor proportions of diamines or aminoalcohols. Suitable dicarboxylic acids include, for example, succinic, glutaric, adipic, suberic, azelaic, sebacic, phthalic, isophthalic and terephthalic acids and mixtures of these. Suitable glycols include, for example, ethylene glycol, 1,2-propylene glycol, 1,3-butylene glycol, 2,3-butylene glycol, diethylene glycol, tetramethylene glycol, pentamethylene glycol, hexamethylene glycol, decamethylene glycol, and 2,2-dimethyltrimethylene glycol. Suitable diamines or aminoalcohols include, for example, hexamethylene diamine, ethylene diamine, monoethanolamine, phenylene diamines and tolylene diamines. Small proportions of polyhydric alcohols, for example, glycerol or trimethylolpropane may also be used if branched polyesters or polyesteramides are desired. The polyesters and polyesteramides should preferably have an acid value of less than 5 mg. KOH/g. and a molecular weight between 800 and 5000, preferably between 1000 and 2700. Mixtures of polyesters and polyesteramides may be used.

As examples of hydroxyl-ended polyesters which may be used there may be mentioned polymers and copolymers of cyclic oxides, for example, 1,2-alkylene oxides such as ethylene oxide, epichlorohydrin, 1,2-propylene oxide, 1,2-butylene oxide, 2,3-butylene oxide oxycyclobutane and substituted oxycyclobutanes and tetrahydrofuran. There may also be mentioned polyethers obtained by the polymerisation of an alklylene oxide in the presence of a basic catalyst and water, a glycol or a primary monoamine. Mixture of polyethers may be used.

As examples of simple polyhydric alcohols of low molecular weight there may be mentioned ethylene glycol, 1,2-propylene glycol, 1,2-butylene glycol, 2,3-butylene glycol, glycerol, trimethylolethane, trimethylolpropane, pentaerythritol, the hexane triols and sorbitol. There may also be used the condensation products of these polyhydric alcohols with ethylene oxide or 1,2-propylene oxide or both such that the molecular weight of the product does not exceed about 500.

Surprisingly, it has been found that the use of mixtures of tertiary amines other than 4-N,N,-dialkylaminopyridines together with dialkyl tin dialkanoates exhibit no enhanced catalytic effect on the rate of the isocyanate/hydroxyl reaction, the components of the catalyst mixture merely having the effect which would be expected from their use separately and the synergism shown by the catalyst mixtures of the present invention being absent.

The polyurethanes obtained according to the invention which are derived from alipathic polyisocyanates are valuable in the preparation of lacquers, paints and in seamless flooring applications, where non-yellowing on exposure to light is important.

The invention is illustrated but not limited by the following examples in which parts and percentages are by weight.

EXAMPLE 1

Equivalent quantities of isophrone diisocyanate and a polyester (obtained as described below) are mixed at 25° C. A mixed solvent comprising cyclohexane (1 part), butyl acetate (2 parts), methyl ethyl ketone (2 parts) and 2-ethoxyethyl acetate (3 parts) is added in sufficient quantity to reduce the concentration of solids to 80%.

Various catalysts were then added to portions of the solution, each at 0.5% concentration based on the solids content. After each solution had been stirred vigorously it was allowed to stand and the times at which each gelled were recorded.

The catalysts used, the weights of each component and the times to gelation are recorded in the following Table I:

TABLE 1

| Component | Preparation number | | | | | | |
|---|---|---|---|---|---|---|---|
| | 1 | 2 | 3 | 4 | 5 | 6 | 7 |
| Isophorone diisocyanate (g.) | 2.2 | 2.2 | 2.2 | 2.2 | 2.2 | 2.2 | 2.2 |
| Polyester (g.) | 4.0 | 4.0 | 4.0 | 4.0 | 4.0 | 4.0 | 4.0 |
| Mixed solvents (g.) | 1.55 | 1.55 | 1.55 | 1.55 | 1.55 | 1.55 | 1.55 |
| Dibutyl tin dilaurate (mg.) | 40.0 | 26.0 | | 26.0 | 26.0 | 26.0 | 26.0 |
| 4-N,N-dimethylaminopyridine (mg.) | | 13.0 | 48.0 | | | | |
| 1,4-diazabicyclo-(2,2,2) octane (mg.) | | | | 13.0 | | | |
| N,N-dimethylbenzylamine (mg.) | | | | | 13.0 | | |
| Triethylamine (mg.) | | | | | | 13.0 | |
| β-Diethylaminoethanol (mg.) | | | | | | | 13.0 |
| Time to gel (minutes) | 220 | 21 | 1,200 | 180 | >205 | 202 | >210 |

The polyester used in this example is obtained by esterifying a mixture of pathalic anhydride (1 mol) and adipic acid (5 mols) with hexanetriol (9.55 mols) at 190–200° C. under atmospheric pressure until the acid value of the product has fallen to below 3 mg. KOH/g.; the hydroxyl content is 6.5–7.0%.

EXAMPLE 2

Mixtures of isophorone diisocyanate (2.2 parts) the polyester used in Example 1 (4 parts) and the solvent mixture used in Example 1 (1.55 parts) were prepared and tested for time to reach gelation when catalysed with dibutyl tin diacetate alone and with a dibutyl tin diacetate/4-N,N-dimethylamino pyridine 67/33 mixture, the concentration of catalyst in each case being 0.5% of the combined weight of isocyanate and polyester. With the single catalyst, the preparation gelled in 135 minutes, whereas the mixed catalyst caused gelation in 15 minutes.

EXAMPLE 3

The catalysis of the reaction between hexamethylene diisocyanate and 4,4'-diisocyanatodicyclohexylmethane and the polyester used in Example 1 is shown in the following Table 2:

TABLE 2

| | | | | | | |
|---|---|---|---|---|---|---|
| Polyester (80% solution in mixed solvents as used in Example 1) (g.) | 5.55 | 5.55 | 5.55 | 5.55 | 5.55 | 5.55 |
| Hexamethylene diisocyanate (g.) | 1.7 | 1.7 | 1.7 | | | |
| 4,4'-diisocyanatodicyclohexyl methane (g.) | | | | 2.6 | 2.6 | 2.6 |
| Dibutyl tin dilaurate (mg.) | 40 | 26 | 26 | 40 | 26 | 26 |
| 4-N,N-dimethylaminopyridine (mg.) | | 13 | | | 13 | |
| 1,4-diazabicyclo-(2,2,2)-octane (mg.) | | | 13 | | | 13 |
| Gel time at 25° C. (minutes) | 8 | 3 | 6.5 | 45 | 12 | 45 |

EXAMPLE 4

An isocyanate-terminated prepolymer derived from isophorone diisocyanate, 1,3-butylene glycol and an oxypropylated glycerol of molecular weight 3000 in the ratio 1:0.2:0.55 was prepared in a xylene/2-ethoxyethyl acetate (4:1) solvent at a concentration of 60% solids. The prepolymer was mixed with N,N,N',N'-tetrakis (2-hydroxypropyl) ethylene diamine in the ratio NCO:OH of 1:0.75. A catalyst was added at a concentration of 2% based on the solids content of the solution, and the composition so obtained was applied to metal plates at a film thickness of 0.001 inch approximately.

In the case where the catalyst used was a mixture of dibutyl tin dilaurate and 4-N,N-dimethylaminopyridine in the ratio 4:1 the film was fully cured after 3½ hours, whereas when dibutyl tin-dilaurate alone was used, the same degree of cure was only obtained after 7½ hours.

EXAMPLE 5

A predominantly hydroxyl-ended polyesteramide (400 parts), ethyl acetate (51 parts) and a mixed catalyst comprising 4-N,N-dimethylaminopyridine (0.133 parts) and dibutyl tin dilaurate (0.255 parts) were mixed at 25° C. The water content of the mixture was found to be 0.046%. Isophorone diisocyanate (64.1 parts) was added and the mixture was heated at 60° C. for 8 hours.

To the resulting product, which had an isocyanate content of 0.85%, 1,4-butane diol (4.31 parts) was added. Heating at 60° C. was continued, and the solids content of the mixture was slowly reduced to 45% by the addition of ethyl acetate (515 parts) in small portions. A product having a viscosity of 250 poises at 25° C. was obtained after 3.8 hours.

When the same reaction was carried out using the individual components of the catalyst system the reaction times (measured from the point at which the butane diol was added) found to be necessary to give products of approximately the same viscosity were 84.5 hours when catalysed by 4-N,N-dimethylaminopyridine alone and 63 hours when catalysed by dibutyl tin dilaurate alone.

The polyesteramide used in this example is obtained by heating together adipic acid (1 mol), ethylene glycol (1 mol), diethylene glycol (0.0561 mol) and monoethanolamine (0.0626 mol) at 240° C. under nitrogen until the acid value of the product falls to between 2.0 and 3.0 mg.KOH/g. and the viscosity is between 1200 and 1450 centistokes at 54.5° C.

What I claim is:

1. A process for the manufacture of a polyurethane which comprises reacting an organic polyisocyanate selected from the group consisting of 3-isocyanatomethyl-3,5,5-trimethylcyclohexyl isocyanate and isocyanate-terminated prepolymers thereof with an organic polyhydroxy compound in the presence of a catalyst mixture of (a) 4-N:N-dimethylaminopyridine and (b) a tin compound selected from the group consisting of dibutyl tin dilaurate and dibutyl tin diacetate, the amount of said tin compound being 80 to 33% by weight of said mixture, the amount of catalyst being 0.01% to 5.0% by weight based on the total weight of polyisocyanate and organic polyhydroxy compound.

2. A process as claimed in claim 1 wherein the catalyst mixture contains from 75% to 50% by weight of the tin compound.

3. A process as claimed in claim 1 wherein the amount of catalyst employed is from 0.05% to 2.5% by weight based on the total weight of polyisocyanate and organic polyhydroxy compound employed in preparing the polyurethane.

4. A process as set forth in claim 1 in which the polyisocyanate is 3-isocyanatomethyl-3, 5,5-trimethylcyclohexylisocyanate and the tin compound is dibutyl tin dilaurate.

References Cited
UNITED STATES PATENTS 3,109,825   11/1963   O'Mant et al. ___ 260—77.5 AC MAURICE J. WELSH, Primary Examiner U.S. Cl. X.R.

260—2.5 AC, 18 TN, 75 NC